(12) United States Patent
Hanley (10) Patent No.: US 10,724,907 B2
(45) Date of Patent: Jul. 28, 2020

(54) PRESSURE SENSOR ELEMENT WITH GLASS BARRIER MATERIAL CONFIGURED FOR INCREASED CAPACITIVE RESPONSE

(71) Applicant: Sensata Technologies, Inc., Attleboro, MA (US)

(72) Inventor: Brian K. Hanley, Providence, RI (US)

(73) Assignee: Sensata Technologies, Inc., Attleboro, MA (US)

( * ) Notice: Subject to any disclaimer, the term of this patent is extended or adjusted under 35 U.S.C. 154(b) by 0 days.

(21) Appl. No.: 15/647,971

(22) Filed: Jul. 12, 2017

(65) Prior Publication Data

US 2019/0017883 A1    Jan. 17, 2019

(51) Int. Cl.
*G01L 1/14* (2006.01)
*G01L 9/00* (2006.01)

(52) U.S. Cl.
CPC .............. *G01L 1/14* (2013.01); *G01L 9/0072* (2013.01)

(58) Field of Classification Search
CPC ................................ G01L 1/14; G01L 9/0072
USPC ...................................................... 361/283.1
See application file for complete search history.

(56) References Cited

U.S. PATENT DOCUMENTS

| 4,131,088 A | 12/1978 | Reddy |
| 4,287,772 A | 9/1981 | Mounteer et al. |
| 4,347,745 A | 9/1982 | Singh |
| 4,400,681 A | 8/1983 | Brown et al. |
| 4,771,427 A | 9/1988 | Tulpule et al. |
| 4,825,876 A | 5/1989 | Beard |
| 4,888,662 A | 12/1989 | Bishop |
| 4,903,164 A | 2/1990 | Bishop et al. |
| 5,060,108 A | 10/1991 | Baker et al. |
| 5,101,659 A | 4/1992 | Takeuchi |

(Continued)

FOREIGN PATENT DOCUMENTS

| CN | 103454032 | 12/2013 |
| DE | 4234289 | 11/1993 |

(Continued)

OTHER PUBLICATIONS

Yadollah Hezarjaribi et al., "Evaluation for Diaphragm's Deflection for Touch Mode MEMS Pressure Sensors," The International Arab Journal of Information Technology, vol. 8, No. 2, Apr. 2011, pp. 141-146.

(Continued)

*Primary Examiner* — Michael P McFadden
(74) *Attorney, Agent, or Firm* — Burns & Levinson LLP; Joseph M. Maraia; Joseph P. Quinn (57) ABSTRACT

A method for increasing capacitive response to applied pressure by including a glass layer in the air gap of an improved capacitive sense element. The glass layer has additional thickness compared to previously known capacitive sense elements. The additional thickness is selected to achieve a predetermined increase in dielectric constant across the gap between electrodes. In an illustrative embodiment, the resulting capacitive sense element includes a gap having two dielectric media, air and glass, between the electrodes, wherein the thickness of the glass media in the gap and the thickness of the remaining air gap are predetermined based on the dielectric constant of glass and air to achieve desired capacitive response characteristics of the sensor design.

9 Claims, 6 Drawing Sheets

(56) References Cited

U.S. PATENT DOCUMENTS

| | | |
|---|---|---|
| 5,101,665 A | 4/1992 | Mizuno |
| 5,144,843 A | 9/1992 | Tamura et al. |
| 5,173,766 A | 12/1992 | Long et al. |
| 5,181,417 A | 1/1993 | Nishida et al. |
| 5,184,107 A | 2/1993 | Maurer |
| 5,184,515 A | 2/1993 | Terry et al. |
| 5,186,054 A | 2/1993 | Sekimura |
| 5,209,121 A | 5/1993 | Haefner |
| 5,222,397 A | 6/1993 | Kodama |
| 5,231,301 A | 7/1993 | Peterson et al. |
| 5,284,107 A | 2/1994 | Milne et al. |
| 5,331,857 A | 7/1994 | Levine et al. |
| 5,349,865 A | 9/1994 | Kavli et al. |
| 5,425,371 A | 6/1995 | Mischenko |
| 5,448,444 A | 9/1995 | Provenzano et al. |
| 5,457,988 A | 10/1995 | Delatorre |
| 5,587,535 A | 12/1996 | Sasaki et al. |
| 5,625,151 A | 4/1997 | Yamaguchi |
| 5,629,486 A | 5/1997 | Viduya et al. |
| 5,665,921 A | 9/1997 | Gerst et al. |
| 5,741,975 A | 4/1998 | Vaughn, II et al. |
| 5,802,912 A | 9/1998 | Pitzer et al. |
| 5,866,822 A | 2/1999 | Willig |
| 5,869,766 A | 2/1999 | Cucci et al. |
| 6,033,544 A | 3/2000 | Demers et al. |
| 6,050,145 A | 4/2000 | Olson et al. |
| 6,070,883 A | 6/2000 | Marto |
| 6,119,524 A | 9/2000 | Kobold |
| 6,148,673 A | 11/2000 | Brown |
| 6,204,594 B1 | 3/2001 | Ingham |
| 6,252,759 B1* | 6/2001 | Lange .............. G01L 9/0075 361/283.1 |
| 6,351,998 B1 | 3/2002 | Hohnstadt et al. |
| 6,389,903 B1 | 5/2002 | Oba et al. |
| 6,411,038 B2 | 6/2002 | Murai et al. |
| 6,439,058 B1 | 8/2002 | Aratani et al. |
| 6,453,747 B1 | 9/2002 | Weise et al. |
| 6,487,911 B1 | 12/2002 | Frackelton et al. |
| 6,536,287 B2 | 3/2003 | Beekhuizen et al. |
| 6,539,787 B1 | 4/2003 | Murai et al. |
| 6,568,276 B1 | 5/2003 | Ciminelli |
| 6,595,065 B2 | 7/2003 | Tanizawa et al. |
| 6,700,174 B1 | 3/2004 | Miu et al. |
| 6,715,357 B2 | 4/2004 | Ishiguro et al. |
| 6,763,724 B2 | 7/2004 | Dipaola et al. |
| 6,876,943 B2 | 4/2005 | Wegerich |
| 6,945,118 B2 | 9/2005 | Maitland, Jr. et al. |
| 6,952,042 B2 | 10/2005 | Stratton et al. |
| 7,021,147 B1 | 4/2006 | Subramanian et al. |
| 7,032,456 B1 | 4/2006 | Amin |
| 7,114,396 B2 | 10/2006 | Oda et al. |
| 7,197,937 B2 | 4/2007 | Amore et al. |
| 7,207,214 B1 | 4/2007 | Wlodarczyk |
| 7,302,855 B2 | 12/2007 | Oda |
| 7,316,164 B2 | 1/2008 | Toyoda et al. |
| 7,383,737 B1 | 6/2008 | Lin et al. |
| 7,412,894 B2 | 8/2008 | Ueyanagi et al. |
| 7,518,234 B1 | 4/2009 | Okojie |
| 7,555,957 B2 | 7/2009 | Toyoda |
| 7,570,065 B2 | 8/2009 | Harish et al. |
| 7,578,194 B1 | 8/2009 | Hadjiloucas et al. |
| 7,726,197 B2 | 6/2010 | Selvan et al. |
| 7,739,922 B2 | 6/2010 | Inamori |
| 7,775,119 B1 | 8/2010 | Suminto et al. |
| 7,950,287 B2 | 5/2011 | Hauer et al. |
| 8,024,978 B2 | 9/2011 | Khemet et al. |
| 8,056,752 B2 | 11/2011 | Carnevali |
| 8,104,357 B2 | 1/2012 | Schlitzkus et al. |
| 8,129,624 B2 | 3/2012 | Willner et al. |
| 8,156,816 B2 | 4/2012 | Willner et al. |
| 8,164,007 B2 | 4/2012 | Speldrich et al. |
| 8,215,176 B2 | 7/2012 | Ding et al. |
| 8,250,909 B2 | 8/2012 | Kern et al. |
| 8,297,115 B2 | 10/2012 | Borgers et al. |
| 8,429,956 B2 | 4/2013 | Borgers et al. |
| 8,516,897 B1 | 8/2013 | Jones et al. |
| 8,627,559 B2 | 1/2014 | Suminto et al. |
| 8,671,767 B2 | 3/2014 | Kaiser et al. |
| 8,950,247 B2 | 2/2015 | Borgers et al. |
| 8,984,949 B2 | 3/2015 | Staiger et al. |
| 9,003,897 B2 | 4/2015 | Wade et al. |
| 9,046,436 B2 | 6/2015 | Schlitzkus et al. |
| 9,063,033 B2 | 6/2015 | Mayer et al. |
| 2001/0015402 A1 | 8/2001 | Murai et al. |
| 2002/0029639 A1 | 3/2002 | Wagner et al. |
| 2002/0073533 A1 | 6/2002 | Park |
| 2002/0100948 A1 | 8/2002 | Yoshihara et al. |
| 2003/0150275 A1 | 8/2003 | Wagner et al. |
| 2004/0007073 A1 | 1/2004 | Weise |
| 2004/0007074 A1 | 1/2004 | Dipaola et al. |
| 2004/0007075 A1 | 1/2004 | Ishiguro et al. |
| 2004/0015282 A1 | 1/2004 | Babala et al. |
| 2004/0020300 A1 | 2/2004 | Boehler et al. |
| 2004/0132900 A1 | 7/2004 | Sachdev et al. |
| 2004/0146719 A1 | 7/2004 | Baney et al. |
| 2004/0147140 A1 | 7/2004 | Fan et al. |
| 2004/0200286 A1 | 10/2004 | Mast |
| 2005/0252300 A1 | 11/2005 | Miller |
| 2006/0000289 A1* | 1/2006 | Jonsson .............. G01L 9/0073 73/723 |
| 2006/0042393 A1 | 3/2006 | Kaneko et al. |
| 2006/0042394 A1 | 3/2006 | Kosh et al. |
| 2006/0042395 A1 | 3/2006 | Lepine et al. |
| 2006/0053894 A1 | 3/2006 | Kunda et al. |
| 2006/0090566 A1 | 5/2006 | Oda |
| 2006/0123887 A1 | 6/2006 | Dordet |
| 2006/0214202 A1 | 9/2006 | Zorich et al. |
| 2006/0278012 A1 | 12/2006 | Fujimoto et al. |
| 2007/0148788 A1 | 6/2007 | Hsieh et al. |
| 2007/0154631 A1 | 7/2007 | Sachdev et al. |
| 2007/0202628 A1 | 8/2007 | Wuertz |
| 2007/0205776 A1 | 9/2007 | Harish et al. |
| 2008/0148860 A1 | 6/2008 | Murakami et al. |
| 2008/0222884 A1 | 9/2008 | Bradley et al. |
| 2008/0262584 A1 | 10/2008 | Karmarkar et al. |
| 2009/0071260 A1 | 3/2009 | Speldrich |
| 2009/0075529 A1 | 3/2009 | Johnston et al. |
| 2009/0282926 A1 | 11/2009 | Hauer et al. |
| 2009/0315864 A1 | 12/2009 | Silverbrook et al. |
| 2010/0052578 A1 | 3/2010 | Kim |
| 2010/0192696 A1 | 8/2010 | Schlitzkus et al. |
| 2010/0199777 A1 | 8/2010 | Hooper et al. |
| 2010/0219487 A1 | 9/2010 | Donis |
| 2010/0239109 A1 | 9/2010 | Lutz et al. |
| 2010/0267291 A1 | 10/2010 | Chabineau-Lovgren et al. |
| 2010/0281994 A1 | 11/2010 | Brown et al. |
| 2011/0108322 A1 | 5/2011 | Kaiser |
| 2011/0153277 A1 | 6/2011 | Morath |
| 2011/0290030 A1 | 12/2011 | Willner et al. |
| 2011/0320158 A1 | 12/2011 | Steckenreiter et al. |
| 2012/0067130 A1 | 3/2012 | Kaiser et al. |
| 2013/0052936 A1 | 2/2013 | Jordan |
| 2013/0073189 A1 | 3/2013 | Korenaga et al. |
| 2013/0192379 A1 | 8/2013 | Petrarca |
| 2013/0248024 A1 | 9/2013 | Dunn et al. |
| 2013/0264664 A1 | 10/2013 | Niimura et al. |
| 2013/0336511 A1 | 12/2013 | Underbrink et al. |
| 2014/0130585 A1 | 5/2014 | Borgers et al. |
| 2014/0130586 A1 | 5/2014 | Zwollo et al. |
| 2014/0144206 A1 | 5/2014 | Uehlin et al. |
| 2014/0219713 A1 | 8/2014 | Balsells et al. |
| 2014/0260648 A1 | 9/2014 | Aoyama et al. |
| 2014/0338448 A1 | 11/2014 | Ashino |
| 2015/0135853 A1 | 5/2015 | McNeal et al. |
| 2015/0279767 A1 | 10/2015 | Lee et al. |
| 2015/0377729 A1 | 12/2015 | Hio et al. |
| 2016/0025581 A1 | 1/2016 | Kazama et al. |
| 2016/0133762 A1 | 5/2016 | Blasco |
| 2016/0169758 A1 | 6/2016 | Hooper et al. |
| 2016/0209441 A1* | 7/2016 | Mazzeo .............. G01P 15/125 |
| 2016/0265998 A1 | 9/2016 | Lavado et al. |

(56) References Cited

U.S. PATENT DOCUMENTS

| | | | |
|---|---|---|---|
| 2016/0282205 | A1 | 9/2016 | Huo et al. |
| 2017/0343442 | A1 | 11/2017 | Lee et al. |

FOREIGN PATENT DOCUMENTS

| | | |
|---|---|---|
| DE | 4407212 | 8/1995 |
| DE | 102004048367 | 4/2006 |
| EP | 0085584 | 8/1983 |
| EP | 0947816 A2 | 10/1999 |
| EP | 1074827 | 2/2003 |
| EP | 1211497 | 7/2005 |
| EP | 1560012 | 8/2005 |
| EP | 1826543 | 5/2008 |
| EP | 2390641 | 2/2013 |
| EP | 2620757 | 7/2013 |
| EP | 2848908 | 3/2015 |
| FR | 2791430 | 9/2000 |
| GB | 2066590 | 7/1981 |
| JP | 6-37334 | 2/1994 |
| JP | 2010256187 | 11/2010 |
| WO | 02/42720 | 5/2002 |
| WO | 2003/100371 | 12/2003 |
| WO | 2006/102460 | 9/2006 |
| WO | 2011/155054 | 12/2011 |
| WO | 2013/083320 | 6/2013 |
| WO | 2013/110045 | 7/2013 |
| WO | 2014/132730 | 9/2014 |

OTHER PUBLICATIONS

Combined Search and Examination Report from related Great Britain Application No. GB1807655.4 dated Nov. 27, 2018.
GB Search Report for Great Britain Patent Application No. GB1906642.2, dated Nov. 14, 2019, 4 pages.
GB Search Report for Great Britain Patent Application No. GB1807655.4, dated Feb. 10, 2020, 3 pages.

* cited by examiner

PRESSURE SENSOR ELEMENT WITH GLASS BARRIER MATERIAL CONFIGURED FOR INCREASED CAPACITIVE RESPONSE

FIELD OF THE DISCLOSURE

The present disclosure is in the field of pressure transducers and more particularly to capacitor type pressure sense elements.

BACKGROUND

Pressure transducers are used in a wide variety of machines and systems to sense fluid pressure and applied forces at transducer locations. Pressure transducers generally convert a magnitude of the applied pressure to an electrical signal representing the magnitude. For example, previously known capacitive pressure sensors convert a magnitude of applied pressure to a magnitude of electrical capacitance.

Some previously known pressure sense elements that can be used in pressure transducer applications are based on a capacitive sensing technology. An example of such a sense element uses a pair of ceramic plates and electrodes separated by an air gap, which form a parallel plate capacitor on a rigid ceramic plate substrate. A deformable ceramic plate forms a diaphragm, which adjusts the distance between two electrodes across the gap. A nominal capacitance of the sense element and an amount of change in capacitance under application of pressure loading are characteristics of the sense element that are determined by several mechanical factors. These factors include the thickness of the diaphragm, the area of the diaphragm that is allowed to deform, the area of the electrodes, and the thickness of the air gap between the electrodes.

In certain applications, the air gap distance between electrodes of a sense element is in the order of micrometers. Sense elements that are manufactured with such a small gap thicknesses can have high defect rates due to contamination by conductive particles in the air gap that can provide a conductive path between the electrodes. The conductive particles are difficult to completely eliminate during manufacturing.

To reduce manufacturing defects due to conductive particle contamination in the air gap of a sense element, some previously known capacitive sense elements have included a glass layer over one of the electrodes for providing electrical insulation between the electrodes. However, because glass layer has a different dielectric constant than air in the gap, glass layer has the detrimental effect of altering the sense element characteristics such as the nominal capacitance and the amount of change in capacitance under application pressure loading. Moreover, by including a glass barrier over one of the electrodes, the amount of deflection that the deformable ceramic plate can achieve before contacting the glass barrier is limited. In previously known capacitive sense elements that include an extra glass layer over one of the electrodes, changes to the sensor's capacitive response characteristics are minimized or reduced by minimizing the thickness of the glass layer or increasing the thickness of the air gap.

SUMMARY

Aspects of the present disclosure include a capacitive sensor apparatus. The capacitive sensor apparatus includes a rigid insulator plate, a first electrode formed on the rigid insulator plate, a deformable insulator plate opposite the rigid insulator plate and a second electrode formed on the deformable insulator plate and facing the first electrode. An air gap is formed between the first electrode and the second electrode. A glass barrier layer is also formed between the first electrode and the second electrode. The glass barrier layer is configured by using a predetermined glass barrier layer thickness and/or by selecting a glass barrier layer material to achieve a predetermined increase in capacitive performance. The deformable insulator plate has an area and a thickness selected to deform through the air gap in response to an applied pressure;

Another aspect of the present disclosure includes method for sensing pressure. The method includes providing a first electrode layer on a rigid dielectric substrate and providing a second electrode layer facing the first electrode layer on a flexible dielectric substrate. The method further includes providing a first dielectric layer in the gap between the first electrode layer and the second layer. The first dielectric layer includes a solid dielectric material, such as glass, for example, covering the first electrode layer. According to an aspect of the present disclosure, the thickness and dielectric constant of the first dielectric layer selected to provide a predetermined increase in capacitance between the first electrode layer and the second electrode layer. The method further includes providing a second dielectric layer in the gap. The second dielectric layer includes a compressible dielectric material adjacent the second electrode layer. The second dielectric layer may be air or other gas, for example. The method includes exposing the flexible dielectric substrate to a pressure, and measuring a capacitance between the first electrode layer and the second dielectric layer. The second dielectric layer has a thickness selected to allow a predetermined deflection distance of the flexible dielectric substrate into the gap.

BRIEF DESCRIPTION OF THE DRAWINGS

The details of one or more embodiments of the disclosure are set forth in the accompanying drawings and the description below. Other features, objects, and advantages of the disclosure will be apparent from the description and drawings, and from the claims.

DETAILED DESCRIPTION

Figure 1:
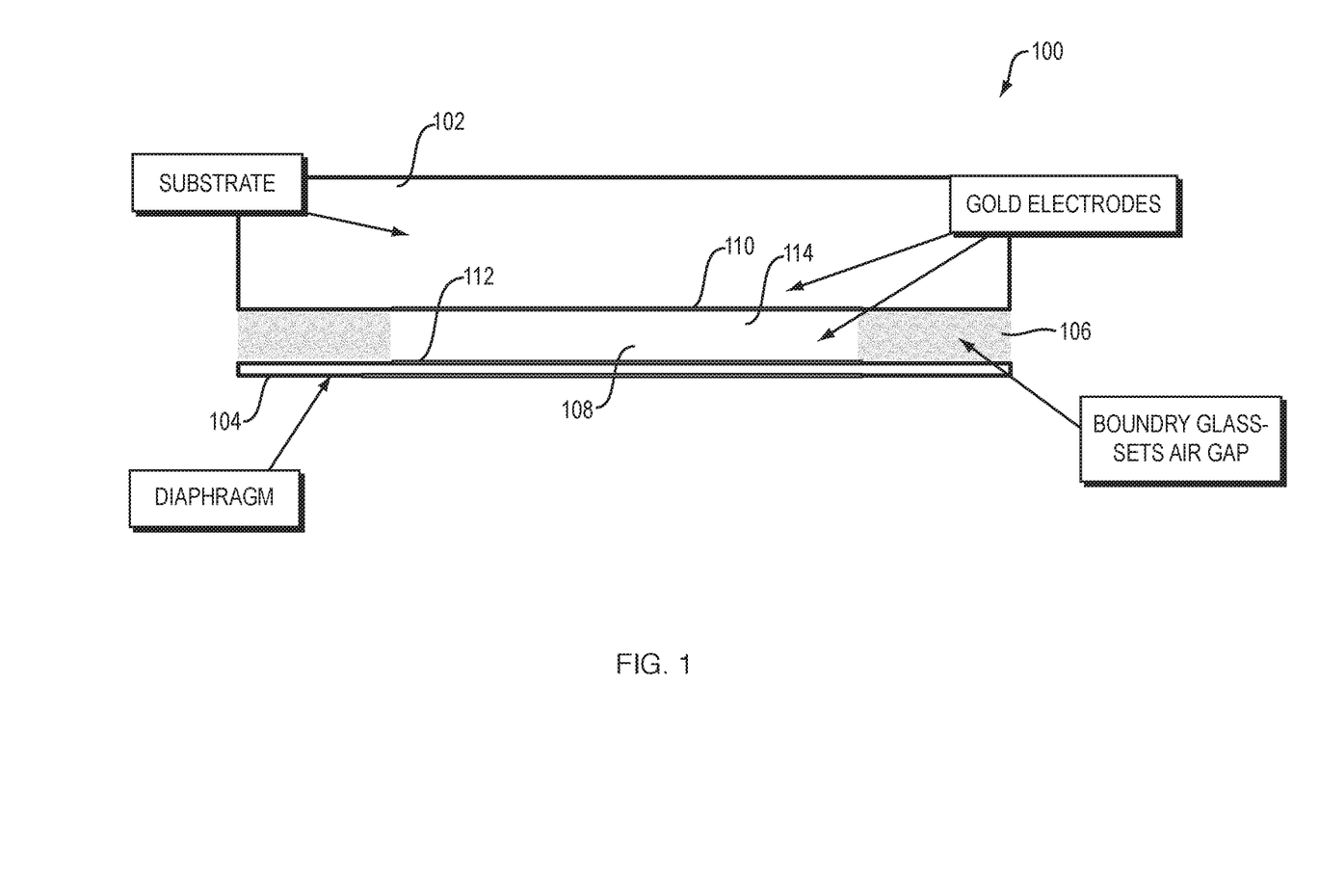
FIG. 1 is a diagrammatic illustration of a previously known capacitive sense element.

FIG. 1 shows a previously known capacitive sense element having two electrodes forming a capacitor along with a layer of boundary glass providing separation between the electrodes, a rigid substrate, and a thin diaphragm capable of predictably deflecting in response to applied pressure.

As shown in FIG. 1, the previously known pressure transducer 100 includes a substrate 102, a diaphragm layer 104 and a boundary glass layer 106 between the substrate 102 and the boundary glass diaphragm layer 104. A void 108 extends through the boundary glass layer 106. A first electrode layer 110 is formed on the substrate 102 in the void 108, and a second electrode layer 112 is formed on the diaphragm layer 104 in the void 108. An air gap 114 is formed in the void 108 between the first electrode 110 and the second electrode 112.

Figure 2:
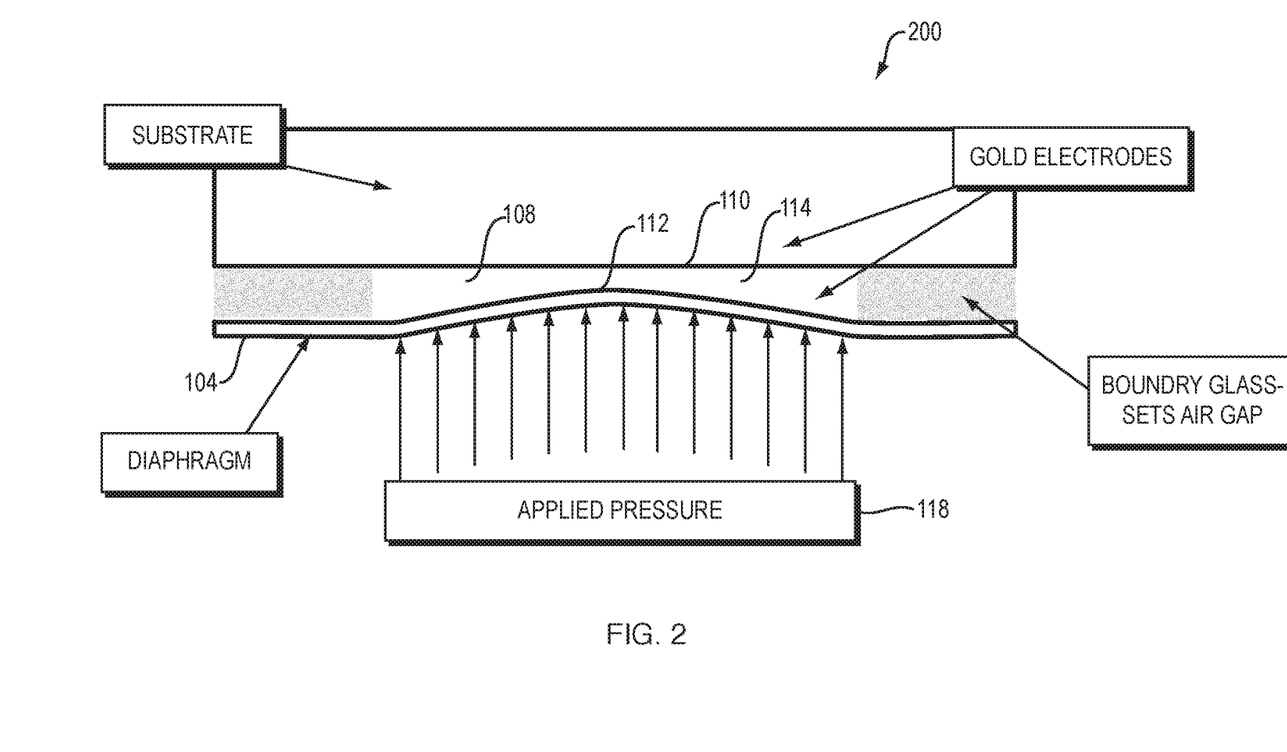
FIG. 2 is a diagrammatic illustration of a previously known capacitive sense element.

FIG. 2 shows the same capacitive sense element 100 shown in FIG. 1, with a pressure applied to deflect the diaphragm. The reduced distance between the electrodes increases the capacitance of the sense element and can be calculated from material properties and dimensions.

When a pressure 118 is applied to the diaphragm layer 104, the diaphragm layer 104 is deflected into the void 108 thereby decreasing the air gap thickness between the first electrode layer 110 and the second electrode layer 112. The decreased air gap thickness results in a difference in capacitance between the first electrode layer 110 and second electrode layer 112. Changes in capacitance are easily measurable and provide a signal that is representative of the applied pressure 118.

Such previously known pressure transducers 100 have been prone to failure when the air gap 114 is not free from conductive particles. Conductive particles that can enter the air gap 114 and provide a conductive bridge between the first electrode and the second electrode are a natural byproduct of the manufacturing process and have been difficult or impossible to completely eliminate.

Figure 3:
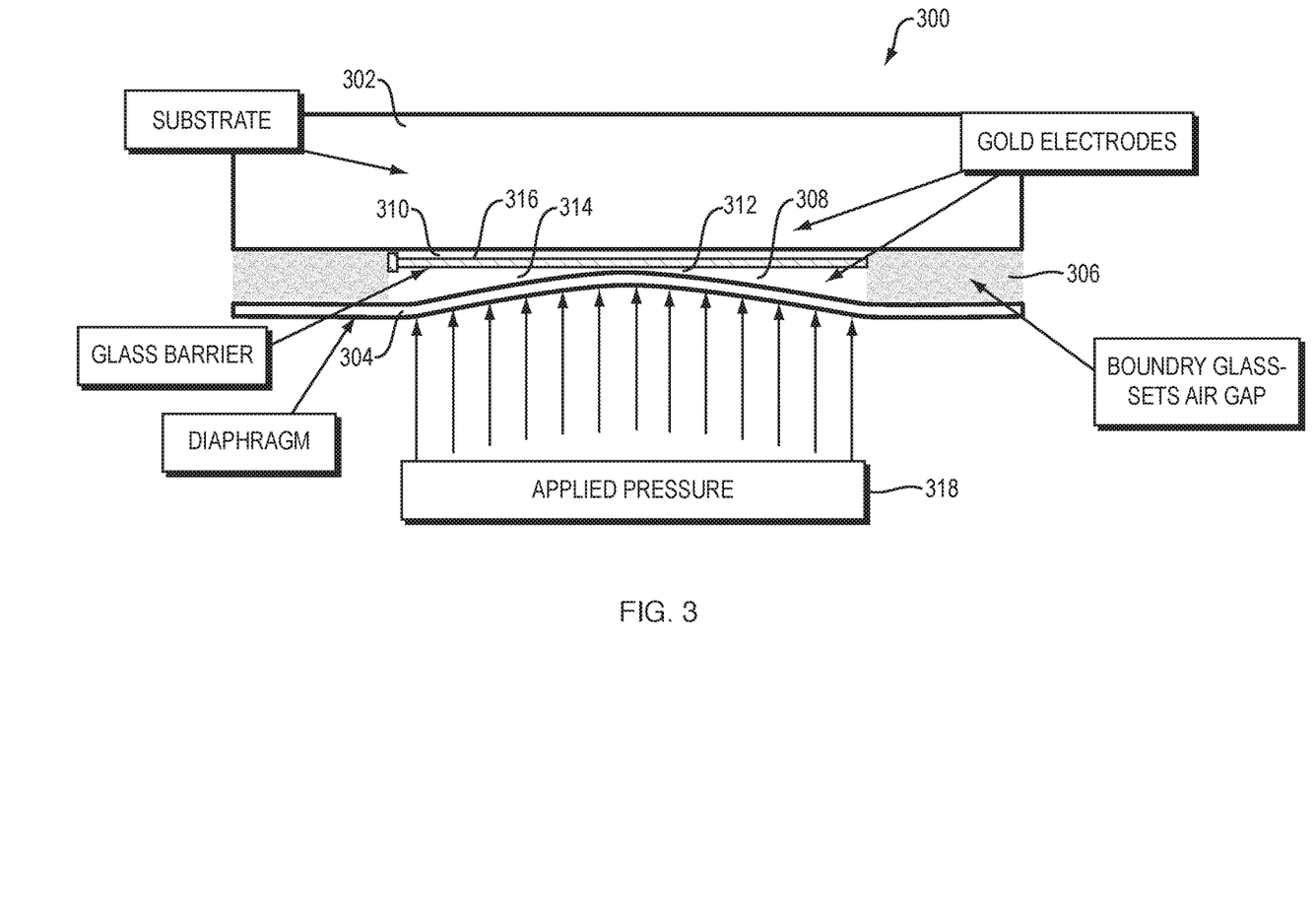
FIG. 3 is a diagrammatic illustration of a capacitive sense element including a glass barrier layer according to the PRIOR ART.

FIG. 3 shows a previously known capacitive sense element 300 which is similar to the sense element 100 shown in FIGS. 1 and 2, but also includes a glass barrier layer 316 over one of the electrodes 310.

The capacitive sense element 300 includes a substrate 302, a diaphragm layer 304 and a boundary glass layer 306 between the substrate 302 and the diaphragm layer 304. The boundary glass layer 306 includes a void 308 that creates a gap between the substrate 302 and the diaphragm layer 304. A first electrode layer 310 is formed on the substrate 302 in the void 308, and a second electrode layer 312 is formed on the diaphragm layer 304 in the void 308. An air gap 314 is formed in the void 308 between the first electrode 310 and the second electrode 312.

The glass barrier layer 316 prevents bridging between electrode layers 310, 312 by conductive particles in the air gap 314. The glass barrier layer 316 between the first electrode 310 and the second electrode 312 has a higher dielectric constant than the air it replaces and accordingly increases the capacitance of the sense element 300 as compared to the sense element 100 shown in FIGS. 1 and 2.

The different dielectric constant of the glass barrier layer 316 affects the capacitance of the sensor element 300 in response to an applied pressure 318. The dielectric behavior of the glass barrier layer 316 also changes with temperature at a different rate than air. These differences can affect the resulting sensor element accuracy with changes in temperature. The previously known capacitive sense element 300 is configured to minimize the capacitive influence of the glass barrier layer by increasing the target gap dimension. For example, in the capacitive sense element 300 the minimum capacitor gap target is increased to about 21 to 25 micrometers compared to a minimum capacitor gap target of about 14 to 17 micrometers in capacitive sense elements 100 (FIGS. 1 and 2), which do not include a glass barrier layer.

In the capacitive sense element 300, the glass barrier layer 316 has a thickness of 7 micrometers.

Although the glass barrier layer 316 can prevent shorting between electrodes, its capacitive effect has prevented further reduction of the gap between electrodes, and therefore has not previously been effective to further reduce the size of capacitive sense elements.

According to an aspect of the present disclosure, a glass barrier layer or other dielectric material separating the electrodes in place of the glass barrier layer can be selected to increase capacitive response of a capacitive sense element rather than being treated as a side effect to be minimized.

Figure 4:
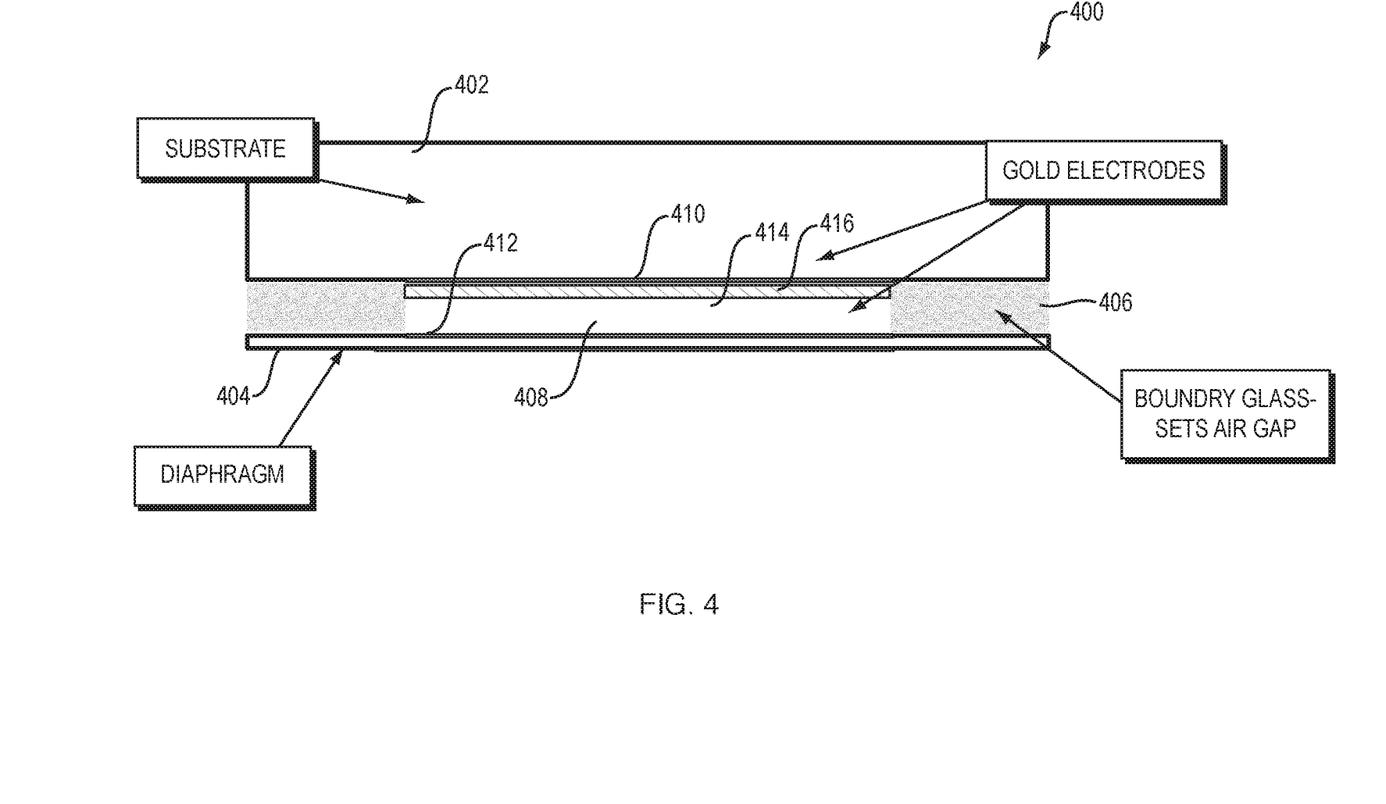
FIG. 4 is a diagrammatic illustration of an improved capacitive sense element including a glass barrier layer according to an aspect of the present disclosure.

FIG. 4 shows a capacitive sense element 400 according to an aspect of the present disclosure. The capacitive sense element 400 overcomes limitations of previously known sense elements, such as the sense element 300 shown in FIG. 3.

The capacitive sense element 400 includes a substrate 402, a diaphragm layer 404 and a boundary glass layer 406 between the substrate 402 and the diaphragm layer 404. The boundary glass layer 406 includes a void 408 that creates a gap between the substrate 402 and the diaphragm layer 404. A first electrode layer 410 is formed on the substrate 402 in the void 408, and a second electrode layer 412 is formed on the diaphragm 404 in the void 408. An air gap 414 is formed in the void 308 between the first electrode 310 and the second electrode 412.

The glass barrier layer 416 prevents bridging between electrode layers 410, 412 by conductive particles in the air gap 414. The capacitive influence of the glass barrier layer 416 increases the capacitive response of the capacitive sense element 400.

The different dielectric constant of the glass barrier layer 416 affects the capacitance of the sensor element 400 in response to an applied pressure 418. The dielectric behavior of the glass barrier layer 416 also changes with temperature at a different rate than air. These differences can affect the resulting sensor element accuracy with changes in temperature.

According to an aspect of the present disclosure, the glass barrier layer 416 prevents shorting between electrodes and is selected and dimensioned such that the capacitive influence of the glass barrier layer 416 increases the capacitive response of the capacitive sense element 400 without increasing the gap between electrodes. For example, in the capacitive sense element 400 the minimum capacitor gap target was reduced to about 17 micrometers compared to a minimum capacitor gap target of about 21 to 25 micrometers in the previously known capacitive sense element 300 (FIG. 3) having a glass barrier layer. This gap dimension favorably compares to a minimum capacitor gap target of about 14 to 17 micrometers in capacitive sense elements 100 (FIGS. 1 and 2), which do not include a glass barrier layer.

The target air gap of the presently disclosed capacitive sensor element 400 is about 10 micrometers. The dielectric constant of the glass barrier layer 416 provides an increased capacitance and increased capacitive response to deflection of the diaphragm layer 404, which allows the target air gap to be reduced to less than 15 micrometers, or about 10 micrometers, for example. The addition of the 7 micrometer thick glass barrier layer increases the overall gap between electrodes to about 17 micrometers.

In comparison, the target air gap in the previously known capacitive sensor element 300 was about 14 micrometers to provide similar operative characteristics to sensor elements 100 which do not have glass barrier layers. The addition of a 7 micrometer glass barrier layer in the previously known capacitive sensor element 300 increases the overall gap between electrodes to about 21 micrometers.

Figure 5:
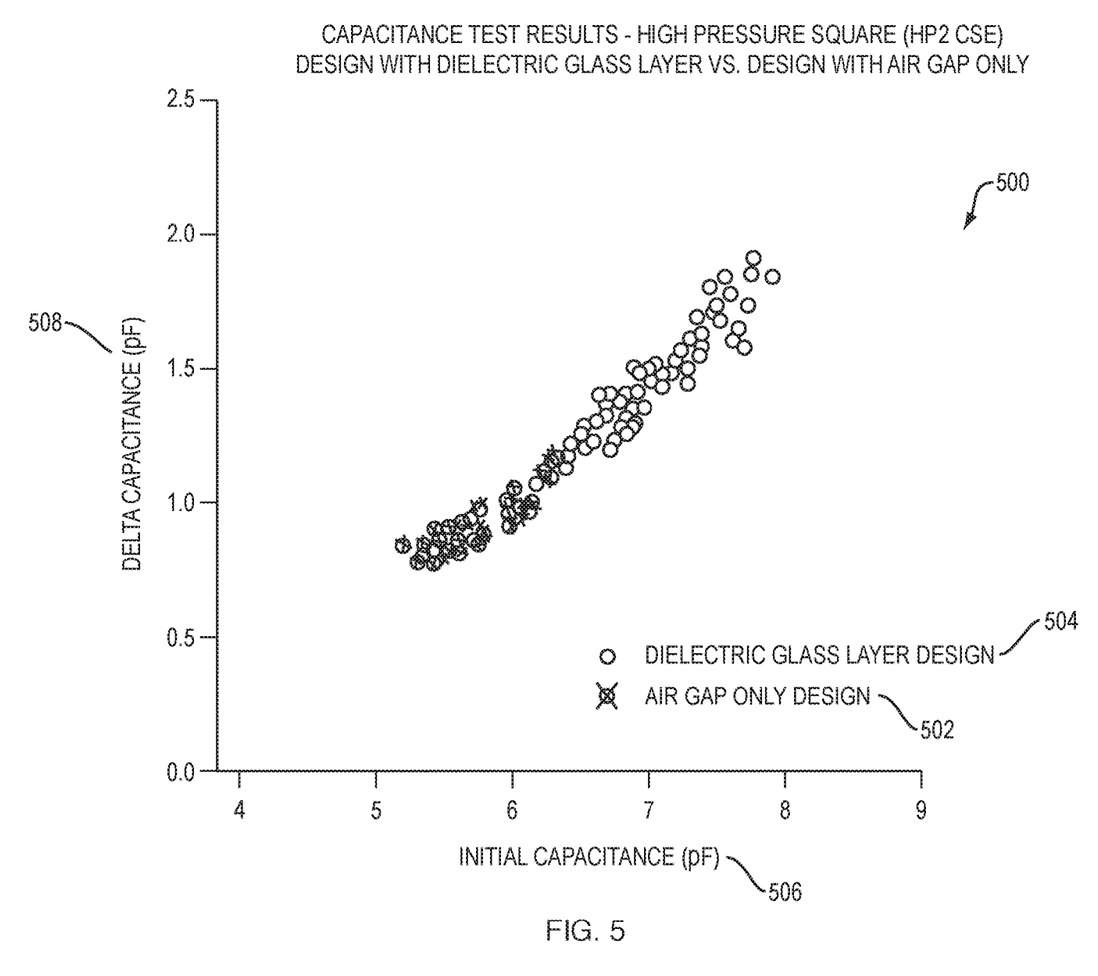
FIG. 5 is a graph demonstrating improved capacitive response of improved capacitive sense elements according to aspects of the present disclosure.

FIG. 5 shows measured capacitances of two groups of sense elements differing only in that a first group 502 represents the sense element 100 shown in FIGS. 1 and 2 and a second group 504 represents the sense element 400 shown in FIG. 4 having a glass barrier layer 416 over one of the electrodes 410 in accordance with an aspect of the present disclosure.

For sense elements in the first group 502 of the example of FIG. 5, (without glass barrier material in the sense element gap), a capacitor gap target of 14 micrometers was used. This represents the smallest gap that can be practically achieved without incurring significant manufacturing yield loss due to conductive particles bridging the gap between electrodes. For sense elements in the second group 504 of the example in FIG. 5 (with glass barrier material in the sense element gap) a capacitor gap target of 17 micrometers between electrodes was used. In the second group 504, the glass barrier thickness target was 7 micrometers which leaves an air gap of less than 15 micrometers. Other design parameters of the sense elements 100, 400 used in the example of FIG. 5 are identical between the two groups.

Each point shown in the graph 500 of FIG. 5 represents a single manufactured sense element. The horizontal scale 506 represents measured capacitance of the sense element 100, 400 with no pressure applied. The vertical scale represents the measured capacitance of the same sense element 100, 400 at a set application-representative pressure. As described herein, the second group 504 representing the improved sense element 400 described herein demonstrates an increase in capacitive response over the previously known sense element 100.

Although measured capacitance data for the previously known capacitive sense element 300 is not included in FIG. 5, the increased gap of about 21 micrometers between electrodes in the previously known capacitive sense element 300 results in capacitive performance that is similar to or worse than the group shown in 502, of FIG. 5, for example.

Another aspect of the present disclosure includes a method for increasing capacitive response to applied pressure by including a glass layer in the air gap wherein the glass layer has additional thickness compared to previously known capacitive sense elements. The additional thickness is selected to achieve a predetermined increase in dielectric constant across the gap between electrodes. In an illustrative embodiment, the resulting capacitive sense element includes a gap having two dielectric media, air and glass, between the electrodes, wherein the thickness of the glass media in the gap and the thickness of the remaining air gap are predetermined based on the dielectric constant of glass and air to achieve the desired capacitive response characteristics of the sensor design.

Figure 6:
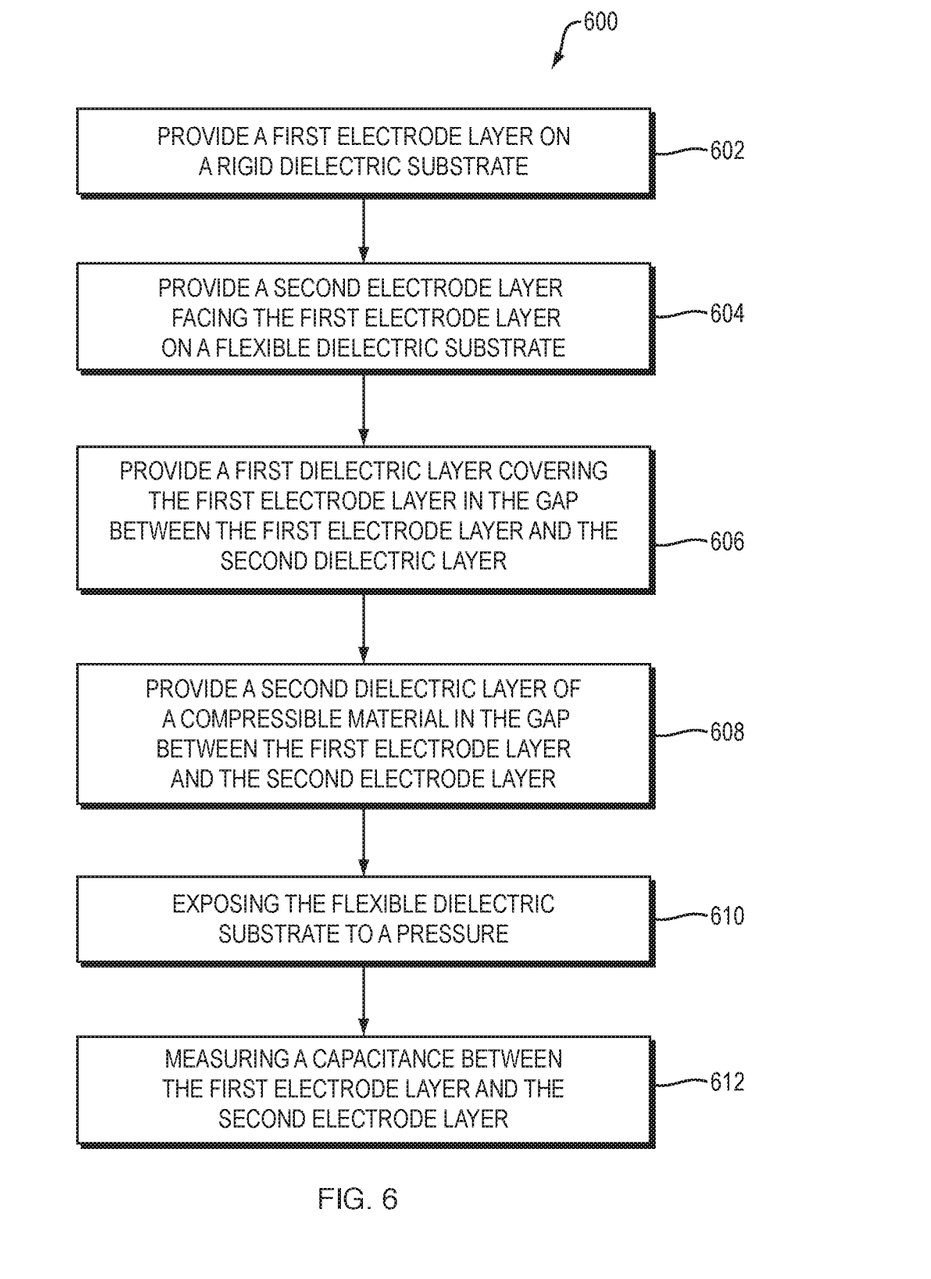
FIG. 6 is a process flow diagram showing a method for sensing pressure according to an aspect of the present disclosure.

Referring to FIG. 6, a method 600 of sensing pressure according to an aspect of the present disclosure includes providing a first electrode layer on a rigid dielectric substrate at block 602, and providing a second electrode layer on a flexible dielectric substrate at block 604 such that second electrode layer faces the first electrode layer. A separation distance between the first electrode layer and the second electrode layer defines a gap. At block 606, the method includes providing a first dielectric layer in the gap from a solid dielectric material covering the first electrode layer. According to an aspect of the present disclosure, the first dielectric layer has a thickness and a dielectric constant selected to provide a predetermined increase in capacitance between the first electrode layer and the second electrode layer. At block 608, the method includes providing a second dielectric layer in the gap from a compressible dielectric material adjacent the second electrode layer. At block 610, the method includes exposing the flexible dielectric substrate to a pressure, and at block 612, the method includes measuring a capacitance between the first electrode layer and the second dielectric layer.

According to an aspect of the present disclosure, the rigid dielectric substrate and/or the flexible dielectric substrate is/are made of a ceramic material. According to another aspect of the present disclosure, the flexible dielectric substrate comprises an area and a thickness selected to deform through the second dielectric layer in response to the pressure. In an illustrative embodiment, according to an aspect of the present disclosure, the first electrode and the second electrode are respective metal layers which are each about 0.4 micrometers thick.

According to an aspect of the present disclosure the second dielectric layer has a thickness selected to allow a predetermined deflection distance of the flexible dielectric substrate into the gap. The second dielectric layer is a gas layer, in which the gas may be air or another dielectric material selected for its dielectric properties to increase capacitive response of the sensor element.

According to another aspect of the present disclosure the first dielectric layer is a glass layer. In an illustrative embodiment, the second dielectric layer has a thickness of about 10 micrometers and the first dielectric layer has a thickness of about 7 micrometers. In an illustrative embodiment, according to this aspect of the present disclosure, the capacitance is between about 5 pF and about 8 pF between when the flexible dielectric substrate is in an undeformed state. In the illustrative embodiment the capacitance changes by between 0.8 pF and 2.0 pF in response to a deflection of the flexible dielectric substrate from an undeformed state to a maximally deformed state. In different embodiments, the capacitance may be in a range of about 5 pF to about 50 pF and the capacitive changes may be in a range of between about 0.5 pF and about 40 pF, for example.

By increasing the capacitive response of a capacitive pressure sense element, the disclosed method and apparatus facilitates the manufacture of smaller sense elements and sense elements in presently available sizes with expanded pressure sensing ranges, for example.

Although the disclosed sense element and method are described herein in terms of a glass dielectric layer between the first and second electrode, it should be understood that other solid dielectric layers may be substituted for glass in various alternative embodiments of the present disclosure.

As various modifications could be made to the exemplary embodiments, as described above with reference to the corresponding illustrations, without departing from the scope of the disclosure, it is intended that all matter contained in the foregoing description and shown in the accompanying drawings shall be interpreted as illustrative rather than limiting. Thus, the breadth and scope of the present disclosure should not be limited by any of the above-described exemplary embodiments, but should be defined only in accordance with the following claims appended hereto and their equivalents.

A number of implementations of the disclosure have been described. Nevertheless, it will be understood that various modifications may be made without departing from the spirit and scope of the disclosure.

What is claimed is:

1. A capacitive pressure sensor apparatus, comprising:
a rigid insulator plate;
a metal first electrode formed on the rigid insulator plate;
a deformable insulator plate opposite the rigid insulator plate;
a metal second electrode formed on the deformable insulator plate and facing the first electrode;
a 7 micrometer thick barrier formed on the first electrode between the first electrode and the second electrode, wherein the barrier covers the first electrode and electrically isolates the first electrode from the second electrode; and
a boundary glass layer separate from the barrier and disposed as a spacer between the rigid insulator plate and the deformable insulator plate, the boundary glass layer defining a void extending between the rigid insulator plate and the deformable insulator plate, wherein the boundary glass layer defines a gap between the first electrode and the second electrode, and wherein the gap comprises an air gap of 10 micrometers, wherein capacitive properties of the barrier improve capacitive response of the pressure sensor apparatus to facilitate performance of the pressure sensor apparatus while the metal second electrode is deformed through the air gap of 10 micrometers.

2. The apparatus of claim 1, wherein the rigid insulator plate is made of a ceramic material.

3. The apparatus of claim 1, wherein the deformable insulator plate is made of a ceramic material.

4. The apparatus of claim 1, comprising a capacitance of between 5 pF and 50 pF between the first electrode and the second electrode when the deformable insulator plate is in an undeformed state.

5. The apparatus of claim 1, comprising a capacitance change of between 0.5 pF and 40 pF in response to deflection of the deformable insulator from an undeformed state to a maximally deformed state.

6. The apparatus of claim 1, wherein the deformable insulator plate comprises an area and a thickness selected to deform by a predetermined distance through the air gap in response to an applied pressure.

7. The apparatus of claim 1, wherein the barrier comprises a glass layer within the gap.

8. The apparatus of claim 1, wherein the barrier is made of a dielectric material selected to increase capacitive response of the capacitive sensor apparatus.

9. The apparatus of claim 1, wherein the barrier has a thickness and a dielectric constant selected to provide a predetermined capacitance between the first electrode and the second electrode.

* * * * *